Jan. 30, 1923.                                                                                     1,443,553
C. T. ALLCUTT.
ELECTRICAL MEASURING SYSTEM.
FILED JUNE 21, 1918.

WITNESSES:
Ed. V. Herron
J. W. Procter

INVENTOR
Chester T. Allcutt
BY
Wesley G. Carr
ATTORNEY

Patented Jan. 30, 1923.

1,443,553

UNITED STATES PATENT OFFICE.

CHESTER T. ALLCUTT, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING SYSTEM.

Application filed June 21, 1918. Serial No. 241,280.

*To all whom it may concern:*

Be it known that I, CHESTER T. ALLCUTT, a citizen of the United States, and a resident of Wilkinsburg, in the county of Allegheny and State of Pennsylvania, have invented a new and useful Improvement in Electrical Measuring Systems, of which the following is a specification.

My invention relates to electrical measuring systems and particularly to means for, and methods of, determining the temperature to which a thermo couple is subjected.

One object of my invention is to provide a measuring system that shall have means for determining the temperature to which a thermo couple is subjected, irrespective of the characteristics of the leads to the same.

Another object of my invention is to provide a system of the above-indicated character that shall have means for correcting for the cold-junction temperatures of a thermo couple.

A further object of my invention is to provide a system of the above-indicated character that shall be simple and inexpensive to construct and effective in its operation.

In practicing my invention, I provide a source of electromotive force that is connected in series-circuit relation with the thermo couple. The current traversing the circuit is adjusted to a predetermined value and the change in resistance necessary to cause an equal current to traverse the circuit when the thermo couple is reversed, is observed. The thermal electromotive force of the couple and, consequently, the temperature to which it is subjected, is equal to one-half of the product of the current traversing the circuit and the change in resistance necessary to cause that current to flow. By the use of this system, the temperature to which a thermo couple is subjected may be determined without compensating for the resistance of the conductors that connect the thermo couple to the measuring device and relatively simple auxiliary means may be provided for compensating for the temperature of the cold junction of the thermo couple.

Figure 1:
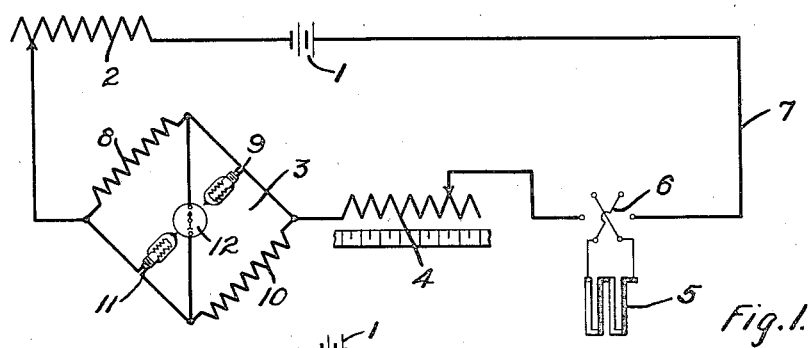
Figure 2:
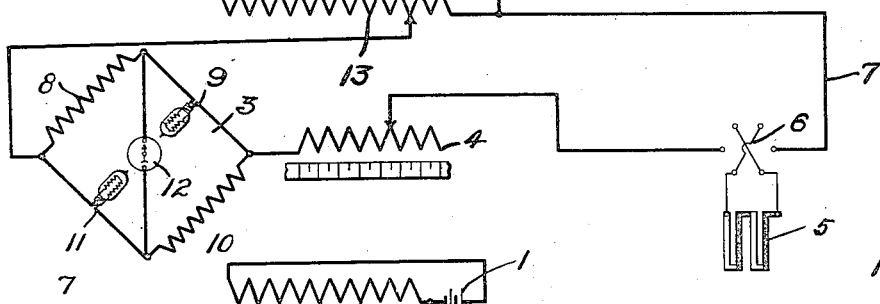
Figure 3:
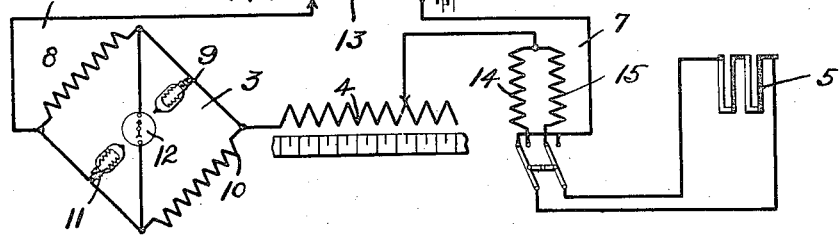
Figure 4:
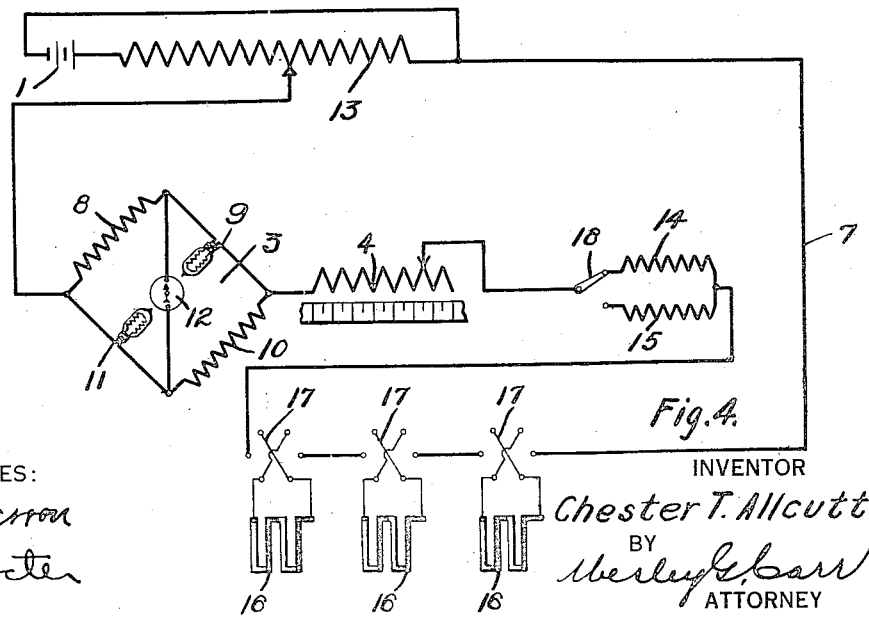

In the accompanying drawings, Figure 1 is a diagrammatic view of a measuring system embodying my invention; and Figs. 2, 3 and 4 are diagrammatic views of modified forms of measuring systems embodying my invention.

A source 1 of electromotive force is connected in series relation with an adjustable resistor 2, a current standard device 3, a calibrated adjustable resistor 4 and a thermo couple 5 the thermal electromotive force of which is to be determined. A double-pole double-throw switch 6 is connected between the circuit 7, thus constituted, and thermo couple 5 for the purpose of reversing the connection of the thermo couple to the circuit, under predetermined conditions.

The current standard 3 comprises a Wheatstone bridge having arms 8, 9, 10 and 11 and a galvanometer 12. The arms 8 and 10 are of such material that the resistance thereof is independent of the current traversing the same, and the arms 9 and 11 are of such material that the resistance thereof varies in accordance with the current traversing the same. In other words, the galvanometer 12 is adapted to become balanced only when a predetermined current traverses the bridge. The device 3 is constructed in accordance with the device shown in my copending application, Serial No. 189,347, filed September 1, 1917. However, any other suitable device for indicating accurately the current traversing the circuit 7 may be used.

If it is desired to determine the thermal electromotive force and, consequently, the temperature to which the thermo couple 5 is subjected, the resistor 2 is so adjusted that the galvanometer 12 indicates a balance or, in other words, until a predetermined current traverses the circuit 7. When this condition obtains, the switch 6 is reversed and the resistor 4 is adjusted to cause an equal current to traverse the circuit 7. The change in resistance of the resistor 4 necessary to obtain the same value of current is a measure of the thermal electromotive force of the couple 5 and the thermal electromotive force is equal to one-half of the product of the current traversing the circuit 7 and the change in resistance in the resistor 4. The resistor 4 may be calibrated directly in temperatures, if so desired.

Since the potential of the source 1 of electromotive force is relatively greater than that of the thermo couple 5, in order to secure greater sensitivity, the source 1 of electromotive force, as shown in Fig. 2 of the drawings, may be connected in circuit with a potentiometer conductor 13 and the circuit 7 connected across various portions thereof. With this construction, the potentials of the known and unknown sources of electromotive force may be more nearly the same and thus more accurate indications may be obtained.

In case it is desired to compensate for the temperature of the cold junction, the arrangement of Fig. 3 may be employed. Two resistors 14 and 15, which may be selectively connected in circuit with the thermo couple, have equal resistance values at zero temperature. The resistor 14 has a zero temperature coefficient. The temperature coefficient of the resistor 15, which may be, for example, "$a$", is such that the variation in resistance value caused by a change in temperature compensates for the effect upon the thermo couple electromotive force caused by the variation of the cold-junction temperature from zero value. It is obvious that, when the room temperature is other than zero degrees, the resistance values of the resistors 14 and 15 are unequal, the difference representing the change in the value of the resistor 15 having the temperature coefficient "$a$". If the resistors are so chosen as to possess the proper values and temperature coefficients, an automatic compensation for cold-junction temperature is provided.

In order to insure that the compensation shall be accurate, the relations between the various factors involved must be as follows:

$$IRa = 2k,$$

where $I$ is the value of the current traversing the circuit, $R$ is the value of each of the resistors 14 and 15 at zero degrees, $a$ is the temperature coefficient of the resistor 15, $k$ is a constant which represents the change in the electromotive force of the thermo couple for each degree of change in the temperature of the cold junction.

It is understood that the cold junction is so located with respect to the resistor 15 that they are subjected to the same variations in temperature.

In the operation of the system of Fig. 3, the circuit is first arranged to comprise the thermo couple 5, resistor 14, resistor 4, current standard 3, potentiometer conductor 13 and battery 1.

The circuit is then arranged by suitable switching mechanism to substitute the resistor 15 for the resistor 14 and to reverse the connections of the thermo couple 5. The temperature of the thermo couple 5, as determined by the adjustments of the resistor 4 under the different conditions, accurately determines the temperature of the thermo couple since the difference between the values of the resistors 14 and 15 compensates for the variation of the cold junction from zero degrees.

If it is desired to determine the temperatures of a plurality of thermo couples 16, a plurality of double-throw switches 17 may be employed for selectively reversing the connections of the thermo couples in the circuit 7, as shown in Fig. 4 of the drawings. In this case, the resistors 14 and 15 may be alternately connected in the circuit 7 by a switch 18, the connections of the selected thermo couple being reversed for the respective arrangements. Thus, by adjusting the resistor 4 and the connections of the circuit 7 to the potentiometer conductor 13, the temperature to which the thermo couple 16 is subjected may be accurately determined.

My invention is not limited to the specific arrangements illustrated, as various modifications may be made therein without departing from the spirit and scope of the invention, as set forth in the appended claims.

I claim as my invention:

1. A measuring device comprising a source of electromotive force, a variable resistor, a thermo couple, means connecting the same in series-circuit relation, means for adjusting the current traversing the circuit to an arbitrary value and means for determining the change in resistance in the variable resistor necessary to cause the same current to traverse the circuit when the connections of the thermo couple are reversed.

2. A measuring system comprising a source of electromotive force, a calibrated variable resistor, a second source of electromotive force the value of which is to be determined, means for connecting the same in series-circuit relation, means for adjusting the current in the circuit to an arbitrary value, and means for determining the change in resistance in the variable resistor necessary to cause the predetermined current to traverse the circuit when the connections of the second source of electromotive force are reversed.

3. A measuring system comprising a main source of electromotive force, a source of electromotive force the value of which is to be determined, means for connecting the same in series-circuit relation, means for adjusting the current in the circuit to an arbitrary value and means for indicating the change in resistance in the circuit necessary to cause an equal current to traverse the same when the connections of the source of unknown electromotive force are reversed.

4. The method of determining the temperature to which a thermo couple is subjected which consists in connecting the thermo couple in a circuit traversed by a predetermined current and measuring the change in resistance in the circuit necessary to cause an equal current to traverse the same when the connections of the thermo couple are reversed.

5. The method of determining the temperature to which a thermo couple is subjected which consists in connecting the thermo couple in a circuit traversed by a predetermined current, measuring the change in resistance in the circuit necessary to cause an equal current to traverse the same when the connections of the thermo couple are reversed and compensating for the variation from zero degrees of the temperature of the cold junction.

6. A measuring system comprising a source of electromotive force, a variable resistor, a thermo couple connecting the same in series-circuit relation, an arbitary value of current to traverse the circuit, means for determining the change in the resistance of the variable resistor necessary to cause an equal current to traverse the circuit when the connections of the thermo couple are reversed and means for correcting for the cold-junction temperature of the thermo couple.

7. A measuring system comprising a source of electromotive force, a variable resistor, a thermo couple, means for connecting the same in series-circuit relation to permit causing a predetermined current to traverse the circuit, means for determining the change in the resistance of the variable resistor necessary to cause an equal current to traverse the circuit when the connections of the thermo couple are reversed, means comprising two resistors having different temperature coefficients for correcting for the cold-junction temperature of the thermo couple, and means for selectively connecting said resistors in circuit with the thermocouple.

8. A measuring system comprising a source of electromotive force, a variable resistor, a thermo couple, means for connecting the same in series-circuit relation to cause a predetermined current to traverse the circuit, means for determining the change in the resistance of the variable resistor necessary to cause an equal current to traverse the circuit when the connections of the thermo couple are reversed, and means for correcting for the cold-junction temperature of the thermo couple, said means comprising two resistors having different temperature coefficients and means for selectively connecting said resistors in circuit with said thermo couple in accordance with the arrangement of the connections of said thermo couple.

9. A measuring system comprising a source of electromotive force, a variable resistor, a thermo couple, means for connecting the same in series-circuit relation to cause a predetermined current to traverse the circuit, means for determining the change in the resistance of the variable resistor necessary to cause an equal current to traverse the circuit when the connections of the thermo couple are reversed, and means for correcting for the cold-junction temperature of the thermo couple, said means comprising a resistor having a zero temperature coefficient, and means for selectively connecting said resistors in circuit with the thermo-couple.

10. A measuring system comprising a source of electromotive force, a variable resistor, a thermo couple, means for connecting the same in series-circuit relation to permit causing a predetermined current to traverse the circuit, means for determining the change in the resistance of the variable resistor necessary to cause an equal current to traverse the circuit when the connections of the thermo couple are reversed, means for correcting for the cold-junction temperature of the thermo couple, said means comprising two resistors, one of which has a zero temperature coefficient, and means for selectively controlling the effectiveness of said means.

In testimony whereof, I have hereunto subscribed my name this 28th day of May, 1918.

CHESTER T. ALLCUTT.

Certificate of Correction.

It is hereby certified that in Letters Patent No. 1,443,553, granted January 30, 1923, upon the application of Chester T. Allcutt, of Wilkinsburg, Pennsylvania, for an improvement in "Electrical Measuring Systems," errors appear in the printed specification requiring correction as follows: Page 3, line 21, claim 6, after the word "couple" insert the comma and words , *means for*, and line 22, after the word "relation" strike out the comma and insert the words *to permit;* same page, lines 34 and 84, claims 7 and 10, respectively, strike out the word "causing"; and that the said Letters Patent should be read with these corrections therein that the same may conform to the record of the case in the Patent Office.

Signed and sealed this 13th day of March, A. D., 1923.

[SEAL.]
KARL FENNING,
*Acting Commissioner of Patents.*